United States Patent [19]

Sarma

[11] Patent Number: 5,074,147
[45] Date of Patent: Dec. 24, 1991

[54] FLOW RATE MEASURING APPARATUS
[75] Inventor: Garimella R. Sarma, Hampton, Va.
[73] Assignee: Analytical Services & Materials, Inc., Hampton, Va.
[21] Appl. No.: 490,318
[22] Filed: Mar. 8, 1990
[51] Int. Cl.[5] .................................................. G01F 1/68
[52] U.S. Cl. .............................. 73/204.15; 73/204.25
[58] Field of Search ........... 73/204.15, 205.16, 204.17, 73/204.18, 204.19, 204.25

[56] References Cited
U.S. PATENT DOCUMENTS

| | | |
|---|---|---|
| 2,583,561 | 1/1952 | General et al. . |
| 3,464,269 | 9/1969 | Froger . |
| 4,059,982 | 11/1977 | Bowman ........................... 73/204.18 |
| 4,217,910 | 8/1980 | Khalil . |
| 4,357,829 | 11/1982 | Kraus et al. . |
| 4,581,929 | 4/1986 | Sugiura ............................ 73/204.15 |
| 4,672,847 | 6/1987 | Uchiyama et al. . |
| 4,682,496 | 7/1987 | Miura et al. ....................... 73/204.16 |
| 4,685,331 | 8/1987 | Renken et al. .................... 73/204.15 |
| 4,831,876 | 5/1989 | Porth et al. . |
| 4,833,912 | 5/1989 | Ohta et al. . |

*Primary Examiner*—Herbert Goldstein

[57] ABSTRACT

The invention is a new and novel flow rate measuring appartus comprising constant voltage or constant power anemometers with unique electronic circuits for maintaining constant voltage or constant power to a hot film or hot wire sensor. The constant power or constant voltage mode of operation is achieved by providing an operational amplifier with a negative feedback circuit driving the hot element sensor. The hot element sensor is located along the negative feedback path of the circuit between a first and second impedance. Amplifying and filtering circuits are also provided.

11 Claims, 5 Drawing Sheets

FLOW RATE MEASURING APPARATUS

FIELD OF THE INVENTION

The present invention relates to flow measuring apparatus and more particularly to control circuitry for hot wire and hot film anemometers.

BACKGROUND OF THE INVENTION

Prior art airflow meters comprise film resistors which function not only as electric heaters, but also as temperature-detecting means for ascertaining temperature of heated air. Some prior art air flow meters comprise temperature-dependant resistors for detecting the temperature of non-heated air. Current flowing through film resistors is regulated to provide a constant differential in temperature between a film resistor and a temperature dependant resistor. By measuring voltage applied to the film resistor, the mass flow rate of air can be determined as the voltage required is dependent on the mass flow rate of air. In this type of aiflow meter, where a temperature dependant resistor is not provided and the current of the heater resistor is regulated to provide a constant temperature of the film resistor, the voltage applied to the film resistor is proportional to the volume flow of air and can be detected and converted to provide the desired information.

Generally, hot element anemometers comprise at least one filament of conductive metal, commonly known as a detector filament, disposed in one arm of a Wheatstone bridge circuit and supplied with a source of electrical energy. The detector filament is heated by electric current, while immersed in the fluid flow stream. The passage of the fluid stream over the hot filament cools the filament and consequently causes its electrical resistance to vary. A difference of potential, the value of which is proportional to the speed of the fluid flow, appears across the measuring diagonal of a Wheatstone bridge. In other known electrothermal air mass sensors, a resistance layer applied to a flat support is traversed by a current resulting in the generation of heat. Depending on the velocity of flow in the air surrounding the sensor, a greater or lesser amount of heat is removed from the resistance layer and the support. By the use of a resistant material having a positive or negative temperature coefficient, the flow can be controlled such that a constant temperature difference above the temperature of the air is maintained. The current required to maintain is this difference a measure of the velocity of flow.

The most popular prior art devices rely on either constant temperature (resistance) or constant current. Using these prior art devices requires considerable knowledge, skill and expertise to obtain consistent and accurate measurements. The operator must first establish the resistance of the sensor at ambient temperature. The adjacent arm of the Wheatstone bridge must then be adjusted to a multiple of the sensor resistance. Next, the offset voltage must be adjusted to provide the necessary current through the sensor. And finally, an inductor must be adjusted, using a square wave input, for proper speed response.

All of these adjustments are necessary because of the Wheatstone bridge network commonly used in prior art devices. An anemometer may be operated with a constant temperature or a constant current to obtain changes in the instantaneous power dissipated as a measure of heat transfer which in turn is a measure of fluid velocity. In a constant temperature operation, the Wheatstone bridge performs a significant role with conflicting requirements. While it is necessary to have an exact balance for true constant temperature operation, such a situation leads to instability due to infinitely large gains being required. In practice the system frequency response and stability are optimized by adjusting the balance reactive element and the offset voltage current.

SUMMARY OF THE INVENTION

The invention is a flow rate measuring apparatus with new and novel electronic circuits for maintaining constant voltage or constant power through a hot wire or hot film sensor. The apparatus comprises a basic circuit having a first and second impedance disposed in series in a negative feedback loop of an amplifier. A hot wire or hot film sensor is connected to the negative feedback loop between the first and second impedances and to ground. This configuration allows either constant power or constant voltage operation. A constant output voltage of the basic sensor circuit is maintained by comparing it with a reference value. Additional circuits are disclosed to provide for amplification and filtering of the signal. It is an object of this invention to provide a flow rate measuring apparatus capable of accurate measurements of fluid flow rates over a wide spectrum of velocities while maintaining the desired sensitivity and response characteristics. It is a further object of this invention to provide a flow rate measuring apparatus requiring minimal startup settings and adjustments by the operator.

BRIEF DESCRIPTION OF THE DRAWINGS

With the above and other objects and advantages in view, the present invention will become more clearly understood in connection with the detailed description of the invention, when considered with the accompanying drawings, of which.

DETAILED DESCRIPTION OF THE INVENTION

Figure 1:
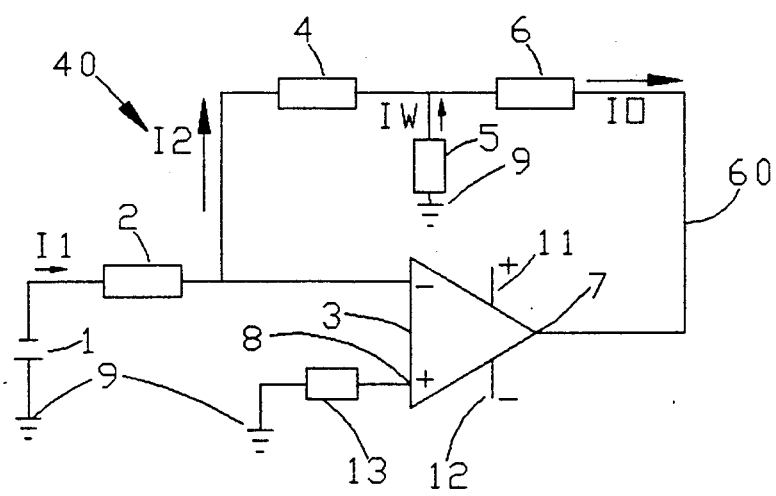
FIG. 1 is a schematic showing a configuration of the basic sensor circuit.

Referring now to FIG. 1, the basic sensor circuit of the flow rate measuring apparatus of the present invention, depicted generally by the numeral 40, is shown in schematic form. The device comprises the following elements:

a) a reference voltage source 1 connected on a first end to ground 9 and on a second end to an impedance 2;

b) operational amplifier 3 connected at a first terminal to an inverting input 10 to impedance 2, and at a second terminal to input 8, serially to ground 9, through resistive impedance 13 having terminals 11 and 12 connected to power supplies with the common terminals being grounded; and c) a T-network comprising sensor element 5 connected at a first end to ground 9 and at a second end to junction of impedance 4 and impedance 6 with impedance 4 and impedance 2 connected to inverting input 10 of operational amplifier 3 and impedance 6 being serially connected to output 7 of operational amplifier 3. A sensor element feedback loop 60 is thereby formed. Any change in resistance or impedance of sensor element 5 is converted to a change in voltage. With such a circuit arrangement the voltage across the sensor element 5 will remain constant regardless of the sensor resistance. Impedance 4 may be purely resistive.

Changes in voltage at output 7 are proportional to fractional changes in the impedance or resistance of sensor element 5 in such circuit arrangements and output voltage is inversely proportional to impedance or resistance of sensor element 5. With appropriate choice of component values for elements in the circuit, sensitivity of sensor element 5 is many times greater than that of conventional Wheatstone bridges. Current flowing through impedance 2 will be almost equal in magnitude, but opposite in sign, to current flowing through impedance 4 for any practical operational amplifier 3 having reasonably high input impedance and open loop gain. As with all operational amplifiers, this condition is required only under DC conditions. The currents I1 and I2, flowing through impedance 2 and impedance 4, remain constant because voltage source 1, impedance 2, and impedance 4 all remain constant. Therefore, there will always be a constant voltage drop across the impedance 4 which is also the same as voltage drop across sensor element 5. Constant voltage eliminates connecting cable capacitance effects on sensor performance. Constant voltage across sensor element 5 causes current, IW, to flow through sensor 5 and the sum of IW and I2 equals current I0 which passes through impedance 6 and is drawn from the output of the operational amplifier.

The voltage at output 7 of operational amplifier 3 changes as function of the fractional changes in impedance of sensor element 5. Without any changes in the sensor impedance, the initial output voltage is linearly related to impedances 4 and 6 and the voltage is inversely related to impedance 2 and the impedance of sensor element 5. Therefore, with respect to initial voltage, changes in the output are monitored as a function of changes in sensor impedance. The instantaneous power in sensor element 5 equals the product of voltage across sensor element 5 and current through sensor element 5. In the constant voltage mode of this invention, the power in sensor element 5 is obtained by measuring changes in current passing through sensor element 5 with the voltage across sensor element 5 remaining constant. Another novel feature of the invention is the constant power mode in which all parameters of sensor element 5 are held constant. In this mode, while voltage across sensor element 5 is being held constant, the external current being supplied to maintain a constant power is measured. This measurement is used to determine changes in operating conditions of the sensor. Proper sensitivity requires that value of impedance 6 be many times larger than that of the value of impedance of sensor element 5. Under this condition with constant voltage across the sensor, changes in the resistance of sensor element 5 will result in a current change. The same current change will also occur in impedance 6, which, because of its larger magnitude, produces larger voltage changes in the output 7 for small changes in current. These larger voltages give rise to higher sensitivities.

Figure 2:
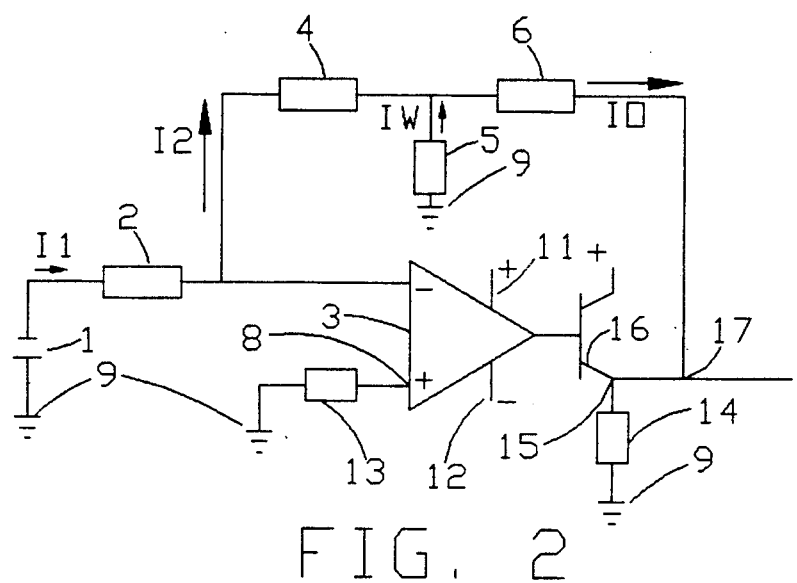
FIG. 2 is a schematic showing the use of a PNP transistor added to the basic sensor circuit.
Figure 3:
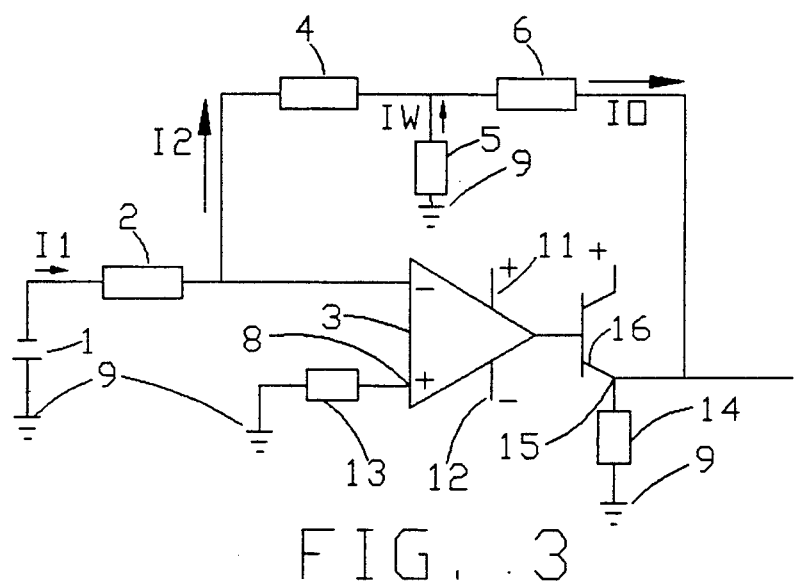
FIG. 3 is a schematic showing the use of a NPN transistor added to the basic sensor circuit.

Heating current passing through the sensor element 5 is provided by feedback loop 60 which may be powered by single or multiple power supplies. However, a single operational amplifier 3 in feedback loop 60 may not supply sufficient heating current in all cases. In such cases, the basic sensor circuit depicted in FIG. 1 can be modified to boost the current without affecting its intended performance by using additional discrete devices such as transistors, current booster hybrid circuits or integrated circuits As an example, a single transistor current boosting arrangement is depicted in FIG. 2. In this arrangement, a negative output voltage is provided and a PNP transistor 16 in the emitter-follower mode is shown as a current boosting stage. Impedance 14 is connected from emitter point 15 to the power supply ground 9 for biasing requirements with the output being taken from emitter point 15. In an alternative embodiment illustrated in FIG. 3, a positive output voltage is provided and an NPN transistor 16 in the emitter follower mode is substituted for the PNP transistor in the previous embodiment Furthermore, in either of the embodiments, the current boosting may be accomplished using a plurality of transistors.

Figure 4:
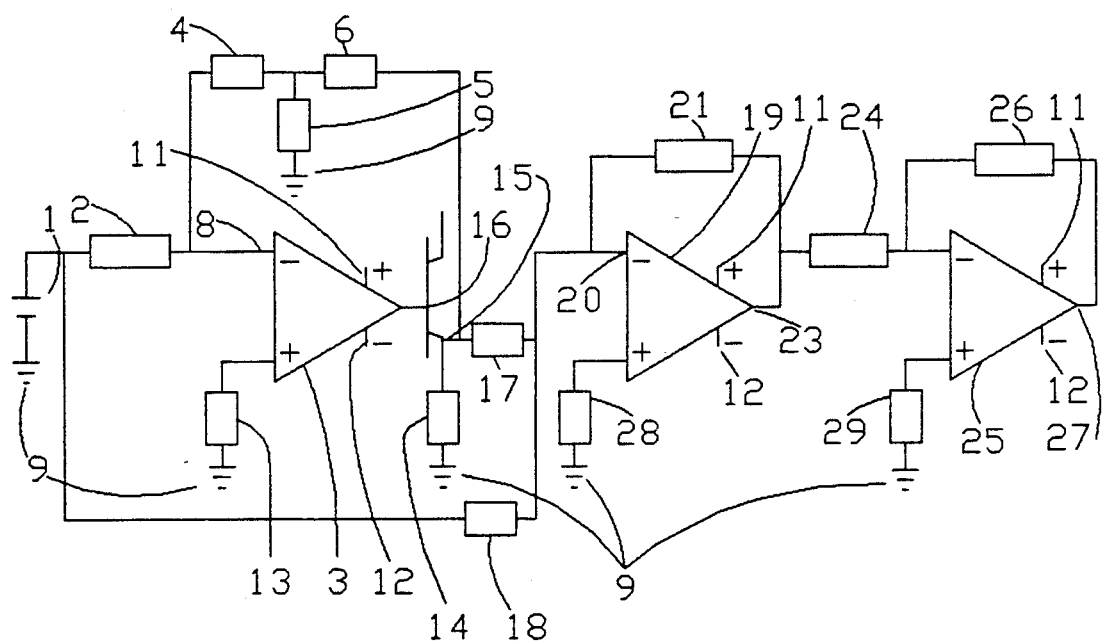
FIG. 4 is a schematic showing the use of an additional amplifier and filter circuit added to the basic sensor circuit.

Referring again to FIG. 1, a recording instrument (not shown) is typically connected at output 7 and initialized to read zero voltage output for zero variations in the impedance of sensor element 5. Under no signal conditions, voltage at output 7 approaches zero which hinders measurement of small voltage changes in response to resistance changes due to fluid flow over sensor element 5. This deficiency may be corrected by providing an offset correction using variable impedance 18 as shown in FIG. 4 where the inverting input point 20 of operational amplifier 19 forms the summing junction of two voltages through impedance 17 and impedance 18. Impedance 28 connects the non-invertng input of the operational amplifier 19 to ground 9 and impedance 29 connects the non inverting input of operational amplifer 25 to ground 9. Output 23 of operational amplifer 19 can be made zero with proper choice of values of impedance 17 and impedance 18. Thus changes at output 23 due to changes in sensor impedance are measurable with respect to zero even though a biasing voltage has been attached Also, with proper choice of value of impedance 21 and impedance 26, amplification and filtering of signals can be accomplished. An additional stage shown with operational amplifier 25 can be used for additional amplification and filtering. The offset adjustment, the amplification and filtering, and the measuring of output can be achieved in alternative ways using the basic invented circuit arrangement.

This invention is comparable to force balance devices such as those used in accelerometers and pressure sensors. In these devices, due to the acceleration or pressure differentials, is continually balanced by an equal and opposite force generated within the instrument. Thus, the force generated for balance is a measure of the input force. Because of this phenomenon, the measurement becomes independent of the dynamics of forward loop amplifiers and components. In the present invention a similar situation, being independent of forward loop gain, is with hotwire anemometers albeit with power dissipated in the sensor. The principle with the hotwire anemometer is based on measuring power lost in an electrical wire due to convection of the fluid flow over the sensor. Conventional anemometers keep either current or resistance constant to measure instantaneous power dissipated in the sensor. However, the power through the sensor is not constant. That of a power balance device can be realized with this invention where the power lost in the sensor is continuously replenished.

Figure 5:
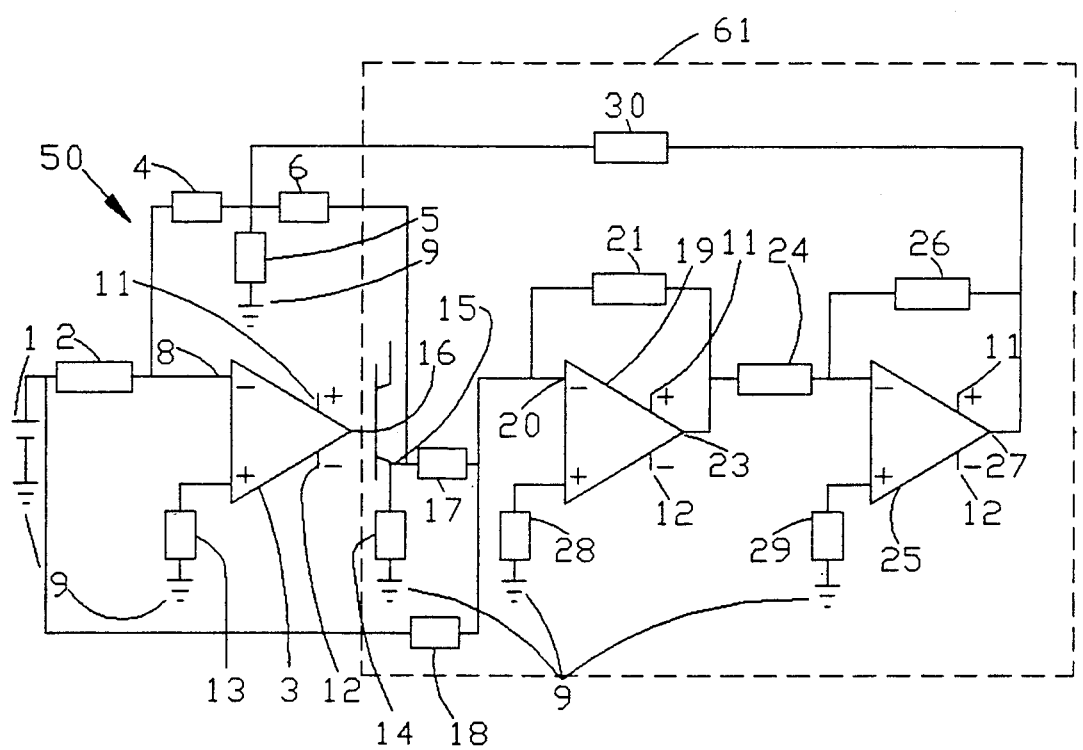
FIG. 5 is a schematic showing the basic configuration with additional amplifier and filter circuits having additional feedback loops.

Power being fed into the sensor is the measure of unknown heat transfer. As in a force balance device, performance is independent of forward loop dynamics. Another novel feature the device is its independence of cable capacitance thereby contributing to improved stability of the output even when there are large fluctuations in velocity flow over sensor element 5. The constant power balance operation previously described using basic circuits will be more fully understood by reference to FIG. 5. The first stage of this circuit, can be identified as the basic sensor circuit already described. With voltage source 1, impedance 2, impedance 4 and impedance 6 remaining constant, the output voltage is uniquely defined by the resistance of sensor element 5. For example, the output voltage remains at ten (10) volts as long as the sensor resistance remains at ten (10) ohms. Typically under such conditions, the resistance of sensor element 5 is reduced to 9.99 ohms due to cooling of the resistor which causes a change in the output voltage as expressed by the following formula:

$$\Delta V_0 = -\frac{R_2 R_F}{R_W^2 R_1} \cdot \Delta R_W V_1$$

Where $V_o$=output voltage; $R_2$=Impedance 6; $R_1$=Impedance 2; $R_F$=Impedance 4; $R_W$=Impedance of sensor element 5; $V_1$=Reference voltage 1. By feeding an external current through sensor element 5 through the junction of sensor element 5 and impedances 4 and 6 the sensor will be heated causing its resistance to return the original 10.0 ohms. When the resistance becomes 10 ohms, the output voltage becomes 10 volts. The output voltage returns to the original value at exactly the same resistance value. Since the voltage across sensor element 5 always remains constant, current through sensor will also return to the original value. Therefore, the power through sensor element 5 will remain constant as long as the output voltage remains constant. As shown in FIG. 5, the output voltage of the basic sensor circuit can be maintained constant by comparing it with a reference value through summing element 18 and the amplifying the difference with operational amplifiers 19 and 25 and feeding back the amplified difference through an impedance element 30. The value of impedance element 30 will be many times larger than impedance of sensor element 5. Therefore the instantaneous current through the sensor is the output voltage 27 divided by the impedance of element 30. This current multiplied by the constant sensor voltage, results in instantaneous power that it being fed back to maintain the basic circuit output at a constant value.

The foregoing description relates to preferred embodiments of the invention. Many variations are possible while still providing the functions of this invention. Any suitable means, for example may be used for accomplishing amplification and are within the scope of these teachings. Also, the circuitry provides all the features of a typical negative feed back control system. For example, greater forward loop gain will provide faster response and lower damping. Numerous variations are possible without interfering with the proper operation of the apparatus. Resistor 13 is not necessary under all conditions Also, the circuit will perform its function with a single power supply. Impedance 6 may be purely resistive in some applications. The impedance of sensor element 5 may be purely resistive in some applications. Theses applications include hotwire/film anemometers, strain measurements, and temperature measurements.

It is understood that other embodiments and variants thereoare possible within the spirit and scope of these teachings.

What is claimed and desired to be secured by Letters Patent of the United States is:

1. A hot element fluid flow rate measuring apparatus comprising:
    a sensing and feedback circuit including a single thermo-sensitive sensor disposed in a path of fluid flow for sensing changes in fluid flow, said sensing and feedback circuit being formed by said thermo-sensitive sensor connected in a T-network such that said sensor is connected at a first end to ground and at a second end to a junction between a first and second impedance wherein said second impedance is greater than an impedance of said sensor;
    a voltage supply system for supplying a constant voltage to said sensing and feedback circuit; and
    an amplifying and filtering circuit connected in parallel to said sensing and feedback circuit for amplifying a feedback signal produced by changes in either voltage across or power in said sensing and feedback circuit such that an output of said amplifying and filtering circuit is proportional to the fluid flow rate, wherein said first impedance is connected to said voltage supply system and said second impedance is connected to said amplifying and filtering circuit.

2. A hot element fluid flow rate measuring apparatus as in claim 1 wherein said amplifying and filtering circuit supplies constant power to said sensing and feedback circuit.

3. A hot element fluid flow rate measuring apparatus as in claim 1 wherein said thermo-sensitive sensor further comprises a resistance type sensor.

4. A hot fluid flow rate measuring apparatus as in claim 1 wherein said thermo-sensitive sensor further comprises a reactance type sensor.

5. A hot element fluid flow rate measuring apparatus as in claim 1 wherein said voltage supply system further comprises:
    a voltage supply source;
    an operational amplifier electrically connected to said voltage supply; and
    a voltage source impedance having a first end connected to said voltage supply source and a second end connected to the junction of an inverting input terminal of said operational amplifier and one end of said first impedance.

6. A hot element fluid flow rate measuring apparatus as in claim 1 wherein said amplifying and filtering circuit further comprises a current boosting circuit.

7. A hot element fluid flow rate measuring apparatus as in claim 1 wherein said amplifying and filtering circuit further comprises an integrated circuit.

8. A hot element fluid flow rate measuring apparatus as in claim 5 wherein said current boosting circuit further comprises a PNP transistor in the emitter-follower mode disposed between the output of said operational amplifier and said second impedance.

9. A hot element fluid flow rate measuring apparatus as in claim 5 wherein said current boosting circuit further comprises a plurality of PNP transistors in the emitter-follower mode disposed between the output of said operational amplifier and said second impedance.

10. A hot element fluid flow rate measuring apparatus as in claim 5 wherein said current boosting circuit further comprises an NPN transistor in the emitter-follower mode disposed between the output of said operational amplifier and said second impedance.

11. A hot element fluid flow rate measuring apparatus as in claim 5 wherein said current boosting circuit further comprises a plurality of NPN transistors in the emitter-follower mode disposed between the output of said operational amplifier and said second impedance.

* * * * *